Dec. 24, 1963   P. A. MANOR ETAL   3,115,151
FLUID PRESSURE BALANCING SYSTEM FOR LUBRICATED PLUG VALVES.
Filed Dec. 21, 1960                    2 Sheets-Sheet 1
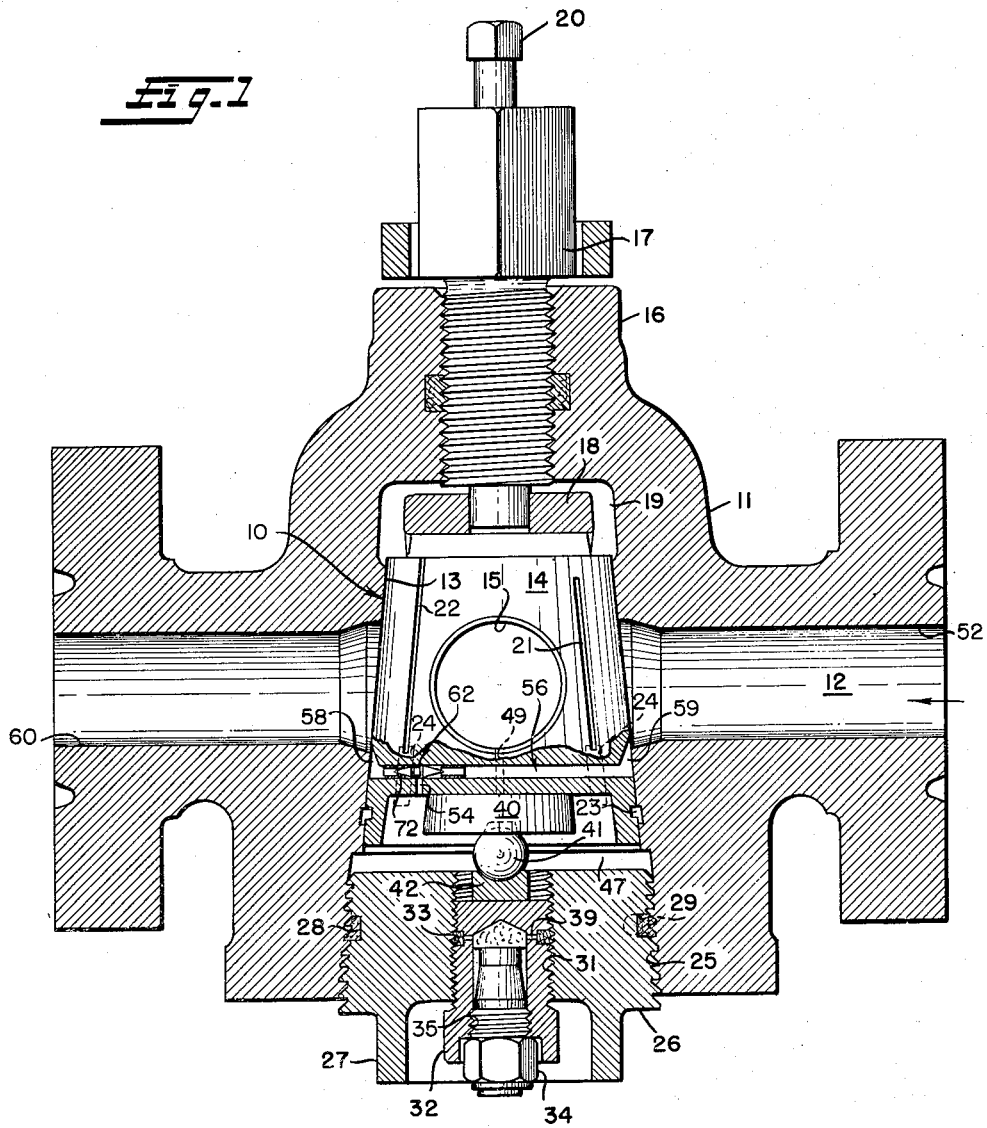
INVENTORS
Paul A. Manor
Charles V. Staller
BY *Strauch, Nolan & Neale*
ATTORNEYS Dec. 24, 1963     P. A. MANOR ETAL     3,115,151
FLUID PRESSURE BALANCING SYSTEM FOR LUBRICATED PLUG VALVES
Filed Dec. 21, 1960     2 Sheets-Sheet 2

INVENTORS
Paul A. Manor
Charles V. Staller

ATTORNEYS

United States Patent Office 3,115,151
Patented Dec. 24, 1963

3,115,151
FLUID PRESSURE BALANCING SYSTEM FOR LUBRICATED PLUG VALVES
Paul A. Manor, Pittsburgh, Pa., and Charles V. Staller, Hastings, N.Y., assignors to Rockwell Manufacturing Company, Pittsburgh, Pa., a corporation of Pennsylvania
Filed Dec. 21, 1960, Ser. No. 77,313
13 Claims. (Cl. 137—246.19)

The present invention relates to plug valves and more particularly to improvements in lubricated tapered plug valves.

The present invention particularly is an improvement of the valve constructions of the general type disclosed in United States Letters Patents to Nordstrom Nos. 2,398,444, issued April 16, 1946, and 2,144,080, issued January 17, 1939, and will be described as applied to a lubricated plug valve of the inverted type disclosed in Patent No. 2,398,444 wherein the operating stem is connected to the small end of the plug.

In valves having an inverted tapered plug, a lubricant chamber is located within the body at the smaller end of the plug. This lubricant chamber receives lubricant under pressure for lubricating and jacking the plug longitudinally. There is also a cavity in the casing at the larger end of the plug connected by a hole to the plug port to prevent entrapment of incompressible lubricant or line fluid in the cavity which would interfere with jacking the plug from its seat in valve opened position. In some tapered plug valves, this cavity serves as a balancing chamber which compensates for the unequal axial forces exerted by line pressure fluid passing through the plug port.

In lubricated plug valves of these types, difficulty in turning the valve or jacking the plug off its seat for introducing a lubricant film is sometimes encountered which cannot be overcome by application of lubricant pressure at the smaller end of the plug. This condition is generally caused by unbalanced pressures acting on the ends of the plug.

When fluid pressure acting on the larger end of a tapered plug exceeds the pressure at the smaller end of the plug, the axial force resulting from the pressure differential acts to lockingly wedge the plug into its seat. This pressure differential may be established by increases in the pressure of line fluid or lubricant introduced into the balancing chamber at the larger end of the plug and trapped in the balancing chamber especially when the plug is moved to its closed position. These variations in pressure at the larger end of the plug are generally caused by changing temperature conditions and when the force produced by the thermal expansion of the trapped liquid exceeds the lubricant pressure force available for jacking the plug off its seat. Under such conditions the plug can be rotated from the closed to the open position only with great difficulty.

According to the present invention, this operational difficulty resulting from pressure increases of fluid trapped at the bottom of the plug in valve closed position is overcome by continuously venting the trapped pressure fluid in the chamber at the larger end of the plug to the upstream side of the valve assembly whenever the plug is in closed position. As a consequence, the pressure in the balancing chamber at the larger end of the valve plug is equalized with the upstream pipeline pressure to thereby prevent fluid pressures from being built up in the balancing chamber in excess of the upstream line fluid pressure.

Accordingly, it is a primary object of the present invention to provide an improved lubricated plug valve assembly having a novel vent system for assuring the equalization of pressures in the upstream side of the valve assembly and the cavity formed by the valve body and the plug at the end of the plug opposite from the valve lubricant chamber.

Another object of the present invention is to provide for an improved lubricated tapered valve plug assembly having a lubricant chamber at one end of the plug and a cavity at the other end of the plug and a novel fluid vent system for equalizing the pressures in the cavity and the upstream side of the valve assembly thereby preventing pressure of fluid trapped in the space at the other end of the plug from exceeding the lubricant pressure in the lubricant chamber, which fluid pressure under normal conditions is about equal to the upstream line fluid pressure, whereby the pressures acting on the ends of the plug are maintained equal to permit ready and easy movement of the valve plug from closed to open positions.

A more specific object of the present invention is to provide an improved lubricated tapered plug valve assembly having a tapered plug, a lubricant chamber formed adjacent to and opened to the smaller end of the plug for receiving lubricant under pressure to axially jack the plug with respect to its seat and a pressure balancing chamber open and adjacent to the larger end of the plug and which is in communication with the valve port for preventing entrapment of incompressible lubricant or line fluid in the chamber in valve open position wherein a novel vent system having a valved passage is provided for continuously venting the balancing chamber to the upstream side of the valve to assure a pressure balance between the upstream side of the valve and the balancing chamber at the bottom of the valve whenever the plug is rotated to closed position thereby relieving excessive fluid pressures which would otherwise act to interfere with backing the plug from its seat for rotation from closed to opened position.

A further specific object of the present invention is to provide an improved lubricated plug valve assembly having a tapered lubricated valve plug, a lubricant chamber adjacent and open to the smaller end of the plug for receiving lubricant under pressure to axially jack the plug, a cavity formed by the valve body adjacent and open to the larger end of the plug, passageways in the plug interconnecting the line fluid passages on opposite sides of the valve plug with the cavity in valve closed position and a special pressure responsive valve disposed in a portion of the passageway connecting the line fluid passages on opposite sides of the valve plug for permitting passage of fluid, in valve closed position, from the cavity to the upstream side of the valve regardless of the direction of line fluid flow through the valve.

Further objects of the invention will appear as the description proceeds in connection with the appended claims and the annexed drawings wherein:

FIGURE 1 is a section through an inverted plug valve assembly incorporating a preferred embodiment of the invention;

FIGURE 2 is a fragmentary enlarged section showing the body closure seal at the larger end of the plug;

Figure 3:
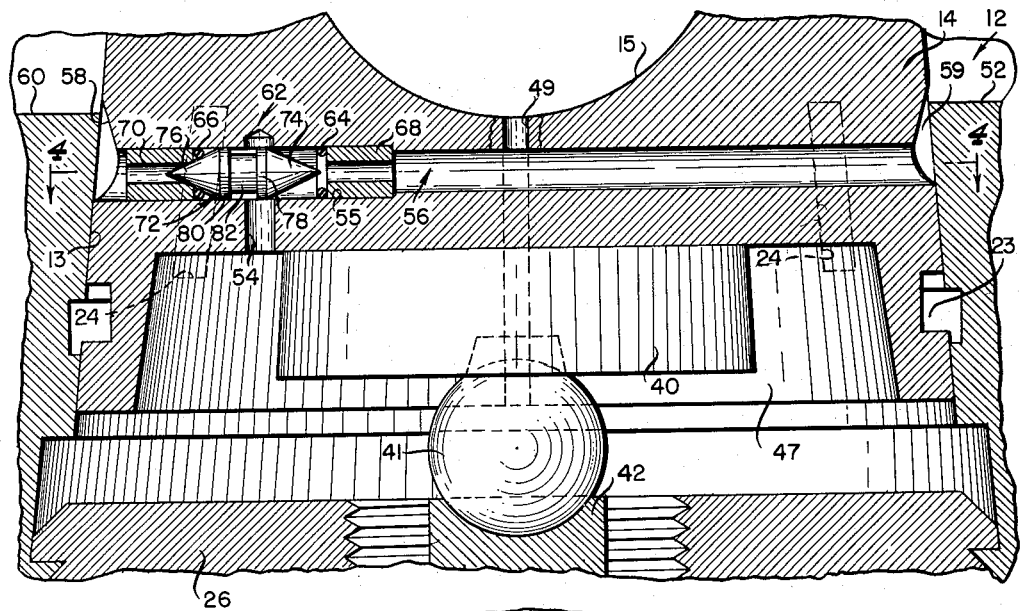
FIGURE 3 is an enlarged fragmentary view at the larger end of the plug showing valved venting arrangements according to the invention.

Referring now to the drawings and more particularly to FIGURE 1 showing the construction according to a preferred embodiment of the present invention, the reference numeral 10 generally designates a tapered plug valve assembly comprising a valve body or casing 11 formed with a longitudinal through passage 12 intersected at right angles by a tapered valve seat bore 13 which is open at both ends.

A valve plug 14, which is tapered, is rotatably seated in the seat 13 and has a port 15 therethrough adapted to register with the passageway 12 for open position of the valve. The casing 11 has a boss 16 at the upper end into which is threaded a rotatable operating stem 17 which forms an operative drive connection with the valve plug 14 at the smaller end by means of a coupling member 18 of the Oldham type as in Nordstrom Patent 2,204,440.

Lubricant is supplied to the chamber 19 formed at the smaller end of the seat 13 through a threaded bore (not shown) in the valve stem and the lubricant is placed under compression by means of the screw 20 threaded into the bore. The bore may contain a suitable check valve to prevent refluxing of the lubricant. Lubricant is supplied to the valve by screw 20 into chamber 19 and is distributed over the valve surface by the grooves 21, 22 and 23 which are interconnected in certain positions by the connecting or dwarf grooves 24. This lubricant system is essentially that of the said Nordstrom patent.

Casing 11 at the larger end of the seat has a threaded bore indicated at 25 and a threaded closure member 26 is tight therein. The threaded closure member 26 has a non-circular end 27 by which it may be rotated by a wrench or the like, and has a seal groove 28 formed in its periphery intermediate its ends. Suitable packing is supplied to the groove 28 and lubricant to provide a pressure tight seal is introduced through a substantially radial passage 29 (FIGURE 2) in the casing 11 registering with groove 28 and lubricant is injected into groove 28 by a suitable check valve fitting 30 or by any other suitable type of lubricant admission fitting.

The threaded closure member 26 has a central threaded bore 31 in which is threaded an adjustment screw member 32, the threaded joint between member 26 and adjustment screw 32 being sealed as by packing in a suitable annular groove 33. A lubricant admission fitting 34 is threaded into a bore 35 in adjustment screw 32 to supply lubricant under pressure through radial ducts 39 into the groove 33.

The larger end of valve plug 13 has a thrust plate 40 suitably supported to engage a hard steel thrust ball 41 which is held in position by a thrust block 42 bearing against adjustment screw 32 so that rotation of screw 32 adjusts the seating pressure of the plug in the body bore.

The foregoing description of valve 10 is substantially the same as the valve structure disclosed in detail in Patent No. 2,398,444, to which reference is made in the event a more detailed description than that herein given is found to be necessary for a complete understanding of the present invention.

As shown in FIGURES 1 and 3, a chamber 47 is formed at the larger end of plug 14 by casing 11 and closure plug 26. A vertical passageway 49 formed in plug 14 connects port 15 with chamber 47 to bleed excessive pressures of incompressible lubricant or line fluid from chamber 47 when plug 14 is in opened position and to maintain the pressure in chamber 47 substantially equal to to the line fluid pressure while plug 14 is in opened position.

While ordinarily the pressures acting longitudinally on plug 14 are substantially equal so that the end thrust on the plug is due only to the differential surface areas of the plug, conditions frequently arise under which the fluid pressure in chamber 47 appreciably exceeds the pressure of lubricant in chamber 19. Thus, where the above described valve assembly is subject to a wide variety of temperatures both internally as a result of the pipeline fluid temperature variations and externally due to variations in the atmospheric conditions, the pressure of fluid in chamber 47 correspondingly increases as temperatures are increased when fluid is trapped in chamber 47.

It is apparent that fluid is trapped in chamber 47 when plug 14 is in closed position and by increasing the pressure of the trapped fluid, a pressure differential of appreciable magnitude is produced across the ends of the plug which wedges plug 14 into its seat. When this occurs, plug 14, in its valve closed position, can be backed off of its seat only with great difficulty. In some instances the pressure differential created across the plug ends by severe temperature variations is sufficient to wedgingly lock plug 14 in its seat with the result that the valve becomes inoperative thereby requiring the removal of the valve from service.

According to the present invention the foregoing difficulty resulting from excessively high pressure differentials being exerted across the ends of plug 14 is overcome by venting the high pressure fluid in balancing chamber 47 continuously to the indicated upstream side 52 of valve passageway 12 when plug 14 is in closed position. This vent is accomplished according to the present embodiment by providing for a vertical passageway 54 extending in parallel spaced apart relationship to the rotational axis of plug 14 and having its lower end in communication with balancing chamber 47. The upper end of passageway 54 intersects at right angles with a smooth cylindrically counterbored portion 55 of a cylindrically stepped bored passage 56 which extends horizontally and diametrically across plug 14 at right angles to plug port 15 and which is exposed at its opposed ends to the peripheral plug seating surface 13 below port 15 and passageway 12. In order to establish communication between passage 56 and the upstream and downstream portions of passageway 12 on opposite sides of plug 14 when plug 14 is in closed position, grooves 58 and 59 having inwardly sloped bottom wall surfaces are formed in the seating surfaces of plug 14, one at each end of passage 56. Grooves 59 and 58 respectively interconnect the opposite ends of counterbored passage 56 with the upstream side 52 and the downstream side 60 of passageway 12 when the plug is in a closed position.

Figure 4:
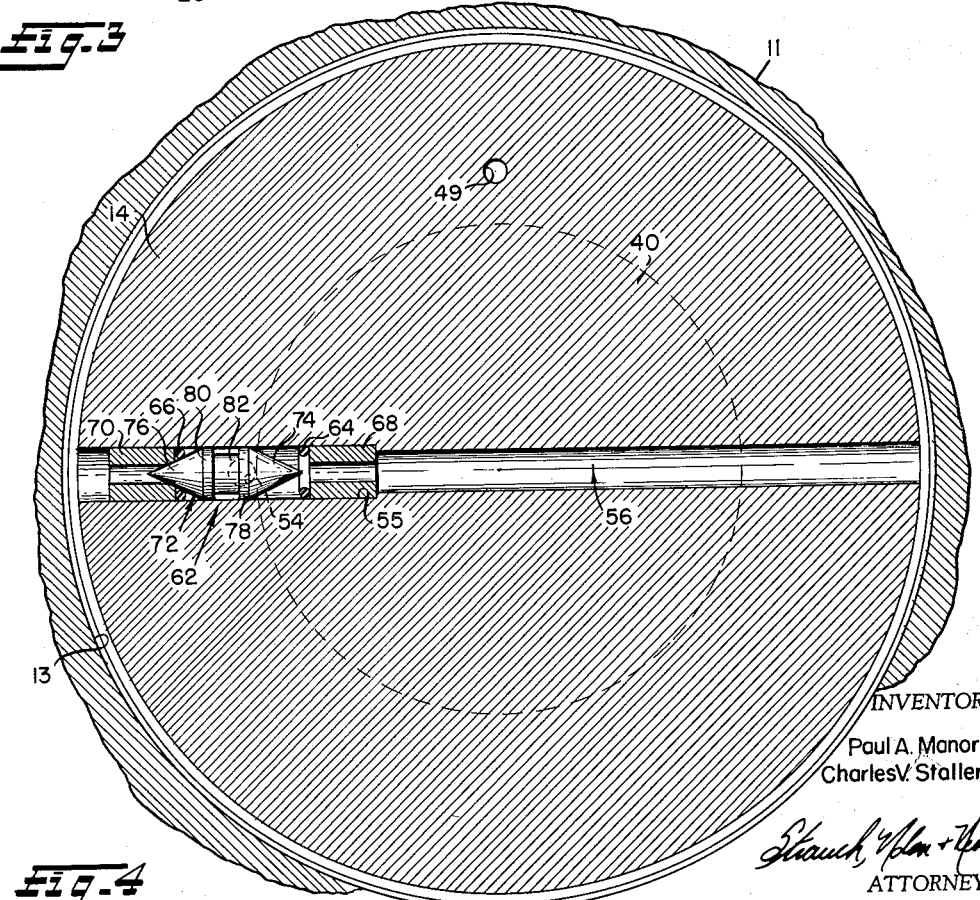
FIGURE 4 is a section substantially along line 4—4 of FIGURE 3 further showing the valved vent bore.

With continuing reference to FIGURES 3 and 4, a shuttle valve assembly 62 is operably disposed in the smooth cylindrical counterbored passage portion 55 and comprises a pair of axially spaced apart O-rings 64 and 66. O-rings 64 and 66 are aligned in counterbored portion 55 one on each side of passage 54 at a predetermined axial distance apart and at equal axial distances from the point where passage 54 intersects the counterbored portion 55 of passage 56. O-rings 64 and 66 are pressed into counterbored portion 55 and are respectively held in place by rigid sleeves 68 and 70 which are press-fitted into counterbored portion 55 with their adjacent planar end faces in axial abutment with the opposed radial surfaces of O-rings 64 and 66. If sleeves 68 and 70 are made up of nylon, Teflon or other similar plastic material, O-rings 64 can be omitted.

Mounted axially between O-rings 64 and 66 for axial displacement in counterbored portion 55 of passage 56 is a valve member 72 which is preferably of one-piece construction having axially opposed conical end sections 74 and 76 adapted to seatingly engage with O-rings 64 and 66 respectively and extending away from enlarged cylindrical sections 78 and 80 which slidably interfit in counterbored portion 55. An intermediate cylindrical section 82 of reduced diameter rigidly joins sections 78 and 80 together. The overall axial length of valve member 72 is such that when it is seated in O-ring seat 66 the cylindrical section 78 is positioned to the left of the right-hand peripheral edge of passage 54 as viewed from FIGURE 3, thereby providing communication between groove 59 and passage 54.

By means of this shuttle valve constructions, it will be appreciated that when valve plug 14 is in the closed position of FIGURE 3, groove 59 registers with the upstream side 52 of fluid passageway 12. The fluid pressure on the upstream side 52 acts on valve member 72 to axially displace valve member 72 to the left, as viewed from FIGURE 3, into seating engagement with O-ring 66 thereby establishing fluid communication between groove 59 and passageway 54 through passage 56 and, at the same time preventing fluid from being bypassed from the upstream side to the down stream side 60 of the valve through groove 58. As a consequence, fluid communication is continually established between the upstream side 52 of passageway 12 and balancing chamber 47 to thereby equalize the fluid pressures therebetween. Thus, the pressure of the fluid in balancing chamber 47 is always equal to the line fluid pressure on the upstream side of the valve whenever valve plug 14 is in closed position. Since the pressure of lubricant in chamber 19 is about equal to the pressure of line fluid on the upstream side of the valve under normal conditions, no pressure differential of appreciable magnitude is established to produce an axial end thrust on plug 14 in valve closed position.

By extending passageway 56 completely through plug 14 so that it respectively communicates with upstream side 52 and downstream side 60 of passageway 12, it will be appreciated that the pressure equalizing operation can also be accomplished when the upstream and downstream sides of the valve are reversed by reversing the direction of line fluid flow. Thus, when the direction of fluid flow is reversed from that shown in FIGURE 1, and plug 14 is in a closed position, valve member 72 is axially displaced to the right, as viewed from FIGURE 3, and into seating engagement with O-ring 64 by the line fluid pressure on the upstream side of the valve which is now located to the left of plug 14. As a consequence, communication between passage 54 and groove 58 is established through passage 55 and since valve member 72 is seatingly engaged in O-ring 64, fluid is precluded from passing from the upstream side of the valve to the downstream side thereof through passage 56. Thus the invention is attained regardless of the direction of line fluid flow.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A valve comprising a casing having a passageway therethrough for flow of fluid and a bore transversely intersecting said passageway, a plug rotatably mounted in said bore adapted to block said passageway in valve closed position of said plug and having a port adapted to connect with said passageway in open position of said plug, said plug and casing providing independent chambers at opposite ends of said plug, means for supplying lubricant under pressure to only one of said chambers, and means in said plug automatically operable by upstream line pressure in said passageway upon rotation of said plug to closed position for obtaining and maintaining equalization of fluid pressure between the upstream side of said passageway and the other of said chambers.

2. In a plug valve, a casing having a passageway therethrough for flow of fluid and a plug seating bore formed transversely of said passageway, a valve plug rotatable in said bore adapted to block said passageway in one position and having a port therethrough adapted to register with the passageway in open position of the valve, said plug and said casing providing a pressure chamber at one end of said plug, and a valved passage through said plug communicating with said chamber automatically operable in the closed position of said plug to connect only the upstream side of said passageway in pressure transmitting relationship with said chamber regardless of the normal direction of fluid flow through said passageway.

3. In a plug valve, a body having a longitudinal passageway therethrough for flow of fluid and a conical seat formed transversely of and intersecting said passageway, a tapered valve plug rotatably mounted in said seat adapted to block said passageway in valve closed position and having a port therethrough adapted to register with said passageway in open position of the valve, said plug and said body providing chambers at opposite ends of said plug, means for supplying lubricant under pressure only to the one of said chambers at the smaller end of said plug, a lubricant groove system in the seating surfaces of said plug and said seat connected to said chamber at the small end of the plug at least when the plug is in open and closed valve positions, a passage through said plug and adapted to register with said passageway at both sides of said plug when said valve plug is rotated to closed position and continuously connected to the one of said chambers at the larger end of said valve plug, and valve means shiftable in response to upstream line pressure in said passage to establish communication between the upstream side of said passageway and said chamber at the larger end of said plug whenever said plug is rotated to closed position.

4. In a plug valve, a casing having a passageway therethrough for flow of fluid and a plug seating bore formed transversely of and intersecting said passageway, a tapered valve plug rotatably mounted in said seating bore and having a stem projecting through an opening in said casing, said valve plug being adapted to block said passageway when in valve closed position and having a port therethrough adapted to register with said passageway in valve open position for controlling fluid flow through said passageway, said plug providing a lubricant chamber with said casing at the smaller end thereof and a pressure balancing chamber at the larger end thereof, a through passage formed in said plug independent of said port and connecting the upstream side of said passageway with the downstream side of said passageway whenever said plug is rotated to closed position, a branch passage formed in said plug and connecting said balancing chamber and said through passage, and valve means movably mounted in said through passage and automatically operable upon rotation of said valve plug to closed position for permitting fluid pressure equalization between said balancing chamber and the upstream side of said passageway and preventing flow of fluid from the upstream side of said passageway to the downstream side of said passageway through said through passage.

5. The plug valve as defined in claim 4, including means defining a duct in said plug which directly connects said port with said balancing chamber.

6. The plug valve as defined in claim 4 wherein said valve means in the through passage comprises a pair of aligned axially spaced apart valve seats disposed in said through passage one on each side of the intersection of said through and branch passages, a valve member mounted for movement between said seats, said valve member being automatically shiftable by upstream line fluid pressure when said plug is in valve closed position and having opposed seating surfaces adapted to seatingly engage with associated ones of said seats.

7. The plug valve as defined in claim 6 wherein said seats are axially aligned O-rings in said through passage.

8. The plug valve as defined in claim 7 wherein said through passage extends diametrically through said plug below said port and said line fluid passage and wherein upstanding grooves are formed in the peripheral seating surface of said plug, one at each end of said through passage, extending into the region of said line fluid passage when said plug is in valve closed position.

9. In a plug valve, a casing having a passageway therethrough for flow of line fluid and a tapered plug seat formed transversely of and intersecting said passageway, a correspondingly tapered ported valve plug rotatably received in said plug seat and mounted for limited axial movement in said casing toward and from engagement with said plug seat, means defining a lubricant chamber in said casing adjacent and open to the smaller end of said tapered plug and a fluid pressure chamber adjacent and open to the larger end of said tapered plug, a valve stem operatively connected with said tapered plug at the smaller end thereof and extending through an opening in said casing, means for introducing lubricant under pressure into said lubricant chamber for axially jacking said plug off of its seat, and means in the plug operable only upon rotation of said plug to closed position for venting entrapped pressure fluid from the chamber adjacent the larger end of said plug only to the upstream side of said line fluid passageway irrespective of the direction of line fluid flow.

10. A plug valve assembly comprising a casing having a fluid passageway adapted to be connected into a pipeline and a bore transversely intersecting said passageway, a ported plug rotatably seated in said bore and adapted to be rotated to align its port with or block said passageway, and means in the plug automatically effective when the plug has been rotated to close said passageway for communicating upstream line fluid pressure to the same end of the plug regardless of the direction of fluid flow in the line and passageway.

11. In the valve assembly defined in claim 10, said last named means comprising a pressure transmitting passage through the plug separate from said port and open at opposite ends to said passageway upstream and downstream respectively of the plug when the latter is in valve closed position, and a line pressure displaced valve in said pressure transmitting passage effective when the plug is in closed position to close the downstream end of said pressure transmitting passage and connect the upstream end thereof to a chamber at said end of the plug.

12. In the valve assembly defined in claim 11, said pressure transmitting passage being a dimetrical bore through the plug provided with longitudinally spaced valve seats and said valve in the pressure transmitting passage being a freely slidable element in the bore movable between said longitudinally spaced valve seats.

13. In a plug valve assembly, a body having a through passageway intersected by a valve plug seating bore, a ported tapered plug in said bore rotatable between a valve closed position where it blocks said passageway and a valve open position where the plug port is aligned with the passageway, means defining a chamber between the larger end of said plug and said body, means for introducing lubricant under pressure between the seating surfaces of said plug and body, and means in the plug operable by upstream line fluid pressure when the plug is in closed position for automatically connecting said chamber in fluid pressure transmitting relationship only with the upstream side of said passageway regardless of the direction of normal fluid flow through said passageway.

References Cited in the file of this patent

UNITED STATES PATENTS

| | | |
|---|---|---|
| 2,398,444 | Nordstrom | Apr. 16, 1946 |
| 2,445,505 | Ashton | July 20, 1948 |
| 2,573,238 | Wunn | Oct. 30, 1951 |
| 2,606,737 | Tratzik | Aug. 12, 1952 |
| 2,866,213 | McArthur | Dec. 30, 1958 |

FOREIGN PATENTS

| | | |
|---|---|---|
| 1,213,078 | France | Oct. 26, 1959 |